United States Patent
Mohanty

(10) Patent No.: US 7,650,389 B2
(45) Date of Patent: Jan. 19, 2010

(54) WIRELESS SYSTEM AND METHOD FOR MANAGING LOGICAL DOCUMENTS

(76) Inventor: Subhashis Mohanty, 3946 Camino Calma, San Diego, CA (US) 92122

( * ) Notice: Subject to any disclaimer, the term of this patent is extended or adjusted under 35 U.S.C. 154(b) by 484 days.

(21) Appl. No.: 11/344,979

(22) Filed: Feb. 1, 2006

(65) Prior Publication Data

US 2007/0180084 A1 Aug. 2, 2007

(51) Int. Cl.
G06F 15/16 (2006.01)
G06F 17/30 (2006.01)
G06F 12/00 (2006.01)
(52) U.S. Cl. .................. 709/217; 707/201; 707/203
(58) Field of Classification Search ......... 709/202–207, 709/213, 217–219, 238–244; 707/104.1, 707/200–203
See application file for complete search history.

(56) References Cited

U.S. PATENT DOCUMENTS

| | | | | |
|---|---|---|---|---|
| 6,671,757 | B1 * | 12/2003 | Multer et al. | 710/100 |
| 6,847,984 | B1 * | 1/2005 | Midgley et al. | 707/204 |
| 6,985,915 | B2 * | 1/2006 | Somalwar et al. | 707/203 |
| 7,415,486 | B2 * | 8/2008 | Multer | 707/201 |
| 7,447,854 | B1 * | 11/2008 | Cannon | 711/162 |
| 7,483,923 | B2 * | 1/2009 | Novik | 707/201 |
| 7,526,575 | B2 * | 4/2009 | Rabbers et al. | 709/248 |
| 2002/0087627 | A1 | 7/2002 | Rouse et al. | 709/203 |
| 2002/0194207 | A1 * | 12/2002 | Bartlett et al. | 707/203 |
| 2003/0056139 | A1 * | 3/2003 | Murray et al. | 714/4 |
| 2003/0159136 | A1 * | 8/2003 | Huang et al. | 717/171 |
| 2003/0182301 | A1 | 9/2003 | Patterson et al. | |
| 2004/0029562 | A1 | 2/2004 | Sharon et al. | |
| 2004/0044703 | A1 * | 3/2004 | Wildhagen et al. | 707/203 |
| 2005/0010616 | A1 | 1/2005 | Burks | |
| 2005/0015413 | A1 * | 1/2005 | Teodosiu et al. | 707/201 |
| 2005/0037787 | A1 * | 2/2005 | Bachner et al. | 455/502 |
| 2005/0050117 | A1 | 3/2005 | Seo et al. | |

(Continued)

FOREIGN PATENT DOCUMENTS

WO WO 2005041549 A1 5/2005

(Continued)

OTHER PUBLICATIONS

RSYNC Algorithm, TridgetlI et al publsihed Jun. 1996.*

(Continued)

Primary Examiner—Asad M Nawaz
(74) Attorney, Agent, or Firm—Manuel F. de la Cerra

(57) ABSTRACT

A system and method is provided for managing logical documents using a wireless mobile device. The wireless mobile device, which may be a wireless handset, connects to the management system through a wireless communication network such as a public telecommunications provider network. The network has other devices, such as computers, servers, data appliances, or other wireless devices. Selected logical documents from the network devices are associated with the wireless mobile device, and the selected logical documents are targeted to be stored, copied, distributed, or backed up to the wireless mobile device. In a similar manner, logical documents originating on the wireless mobile device may be targeted to be stored, copied, distributed, or backed up on selected network devices. A logical document may be, for example, an XML document, a file, a set of files, a disk drive, or the files on a device.

18 Claims, 10 Drawing Sheets

U.S. PATENT DOCUMENTS

| | | | |
|---|---|---|---|
| 2005/0071371 A1* | 3/2005 | Woodhouse | 707/104.1 |
| 2005/0223047 A1* | 10/2005 | Shah et al. | 707/201 |
| 2006/0168136 A1* | 7/2006 | Bethlehem et al. | 709/219 |
| 2007/0067356 A1* | 3/2007 | Mills et al. | 707/201 |
| 2007/0208783 A1* | 9/2007 | Midgley et al. | 707/201 |
| 2007/0226272 A1* | 9/2007 | Huang et al. | 707/201 |
| 2008/0263470 A1* | 10/2008 | Murman et al. | 715/772 |

FOREIGN PATENT DOCUMENTS

WO    WO2005106618 A1    11/2005

OTHER PUBLICATIONS

International Search Report, Feb. 1, 2007.

\* cited by examiner

WIRELESS SYSTEM AND METHOD FOR MANAGING LOGICAL DOCUMENTS

BACKGROUND

This application is related to U.S. patent application Ser. No. 11/296,077, filed Dec. 7, 2005, and entitled "Wireless Controller Device", which is incorporated by reference in its entirety.

The field of the present invention is applications for operation on a wireless remote device. More particularly, the present invention relates to a wireless remote device configured to operate as a storage device in a file management system.

Wireless devices are widely used today, and their use is becoming more widespread as additional applications and devices become available. Also, the network infrastructures have improved wireless coverage, as well as communication quality and speeds. For example, a wireless mobile handset has improved to the point where the mobile handset may have a wide range of entertainment applications, as well as its essential communication capabilities. With these extended capabilities, the wireless handset has become the most widely deployed and most conveniently available remote wireless device. Many users consider their wireless handset to be an essential partner, both in business and in their personal lives. As such, these users almost always have access to their wireless handsets, and are comfortable carrying and using the wireless handset in almost any environment. The wireless handset may take the form of a traditional wireless phone, or may be included with a personal data assistant, gaming device, or music player, for example.

The widespread use of mobile handsets permits users to work remotely while still maintaining communication with a home office, co-workers, or clients. In some cases, these mobile handsets store data files, which users rely on to make decisions and to capture information. For example, a mobile phone may have a data file that has a list of available products, and includes current pricing and delivery information. The user will use this information to quote prices and delivery to clients, and may further use the handset to take orders for available stock. Several salespeople may be taking orders for the same stock, and since the file is not updated, it is possible that the same stock may be sold to multiple customers. Thus, the static file is prone to providing inaccurate pricing and delivery information. Accordingly, it has not proven satisfactory to maintain such data files on a wireless handset. Instead, companies rely on a central system, where a central server maintains a current database of inventory. Then, as each salespersons sells stock, the database is updated. Unfortunately, this requires an active communication to the sever, which is not always possible. For example, wireless service may not be available in some geographic areas, and may be lost inside buildings. In these cases, the salesperson is not able to provide any information as to price, delivery, stock availability, or transact the business, as no communication may be established to the central server.

Further, the proliferation of mobile devices has exacerbated problems of securely backing up data files. More and more data is being generated and modified on mobile devices, and this information is difficult to assimilate into the overall backup processes. This problem is particularly difficult, as the nature of mobile devices subjects them to theft, loss, and destruction. In this way, data on mobile wireless devices is at substantial risk for loss, while being particularly dependent on human process for backup. For example, most mobile devices are backed up by having a user "dock" the wireless device to a desktop computer, which transfers the mobile data to the computer's storage devices. The data may then be backed up using the computers normal back up procedures. For many users, backup is done sporadically, at best, and subjects the mobile's data to permanent loss.

What is needed, then, is a device and system that integrates a wireless remote device into an effectively and efficiently file management system.

SUMMARY

Briefly, the present invention provides a system and method for managing logical documents using a wireless mobile device. The wireless mobile device, which may be a wireless handset, connects to the management system through a wireless communication network such as a public telecommunications provider network. The network has other devices, such as computers, servers, data appliances, or other wireless devices. Selected logical documents from the network devices are associated with the wireless mobile device, and the selected logical documents are targeted to be stored, copied, distributed, or backed up to the wireless mobile device. In a similar manner, logical documents originating on the wireless mobile device may be targeted to be stored, copied, distributed, or backed up on selected network devices. A logical document may be, for example, an XML document, a file, a set of files, a disk drive, or the files on a device.

In one specific example, the logical document management system enables a wireless mobile device to be a logical disk drive for another network device, or for a network device to be a logical disk drive for the wireless mobile device. This enables a secure and efficient method to transfer files between network devices and a wireless mobile handset, for example. This is particularly desirable as the communication between devices uses the typical wireless communication network, so is not limited to physical proximity or physical connection between devices. In another example, the wireless mobile device cooperates with other network devices to provided a redundant backup process, with files distributed among the several devices. In yet another example, the logical document management system provides for distribution and backup of files to multiple devices on the network. The system is also able to provide each device a selectable level of access to its instance of the file, and provides for weighted and automated synchronization of the files.

Advantageously, the logical document management system enables a wireless handset device to be an integral and functioning asset in a file backup system. The system provides for flexible distribution of files among devices on the network, and automatically provides sufficient redundancy to support disaster recovery. The system may be configured to recognize when an instance of a file has been changed, and update other instances of that file according to flexible synchronization rules. In a simple example, the logical document management system may be configured to enable a wireless mobile handset to act as a logical disk drive for a computer system.

BRIEF DESCRIPTION OF THE DRAWINGS

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views. It will also be understood that certain components and details may not appear in the figures to assist in more clearly describing the invention.

DETAILED DESCRIPTION

Figure 1A:
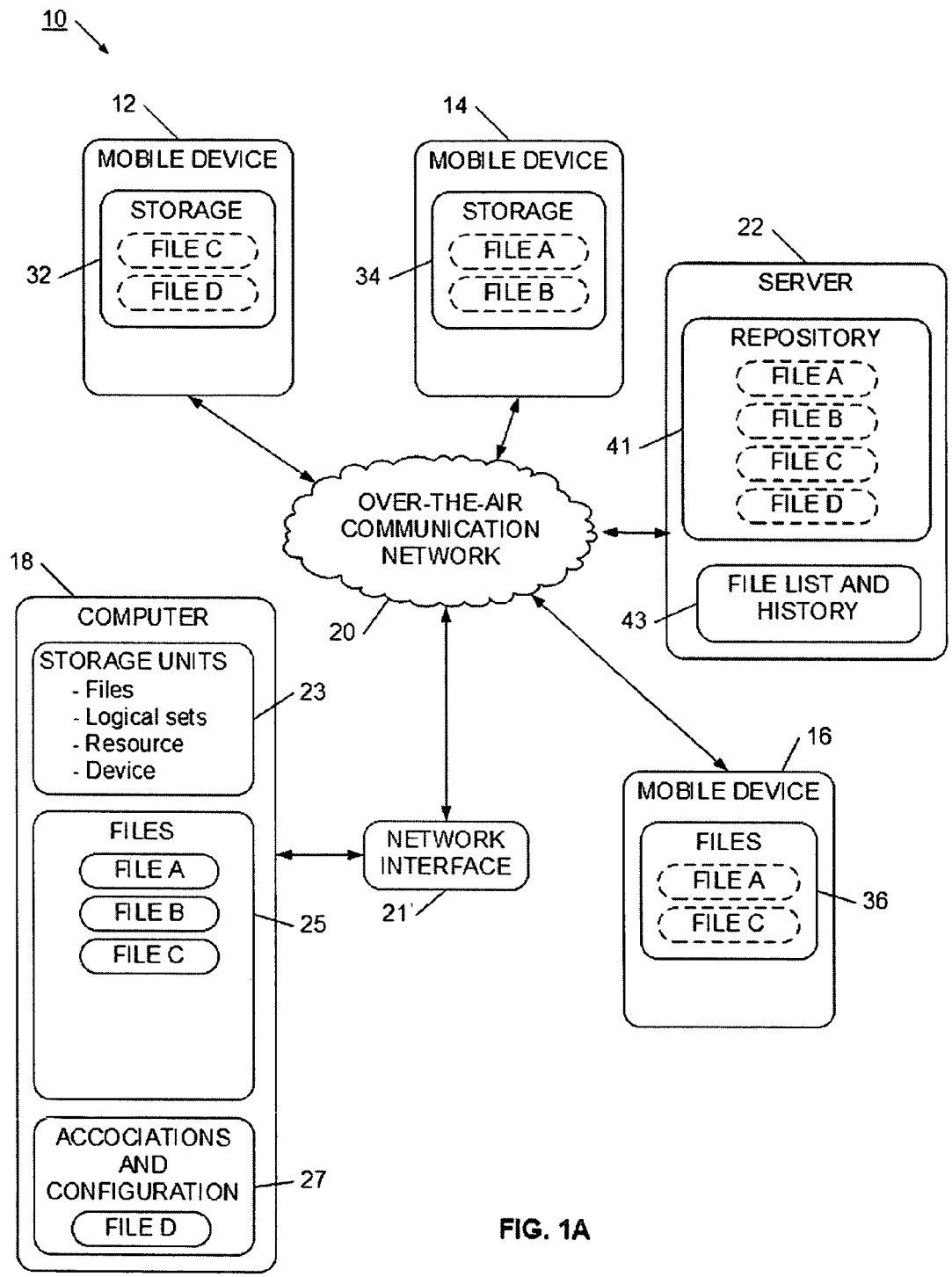
FIGS. 1A, 1B, and 1C are a block diagrams of wireless logical document manager systems in accordance with the present invention.

Referring now to FIG. 1A, a logical document management system 10 is illustrated. Logical document management system 10 is able to securely, conveniently, and seamlessly synchronize and backup data files between multiple storage devices, multiple networks, and multiple mobile devices. After initial setup and configuration, logical document management system 10 acts to automatically protect a user's or company's data, while enabling sophisticated and intelligent access to data, irrespective of which device or user needs the data. As illustrated, logical document management system numeral 10 has mobile device 12, mobile device 14, and mobile device 16 communicating on a public wireless communication system 20. For example the over the air communication network 20 could be a CDMA, WCDMA, UMTS, GMS, edge, PHS, or other public communication system. In other examples, the network may be a proprietary, commercial, government, or military communication network. The design and deployment of wireless communication networks and mobile devices is well known, so will not be described in detail. In another example, the over the air communication network 20 may be a local area, campus, or wide area radio network. This more limited arrangement may enable advanced synchronization and backup processes within a limited commercial, governmental, industrial, or military environment.

The logical document management system operates to seamlessly synchronize, propagate, and back up logical documents. Logical documents provide descriptions for locations of data files, and may be as simple as a single file descriptor, or as complex as an XML description document. Other examples of logical documents are directories, network resources, device drives, or even all files stored on a particular device. The use of a logical document enables a single descriptor to conveniently bring together and organizes multiple data files irrespective of the physical location of the data files. For example, a single XML document may include file links to files on a local drive, to files on network drives, and to data assets accessible using a URL descriptor.

Each mobile device 12, 14, and 16 may be, for example, a wireless mobile handset, a personal data assistant, a portable music player, or other wireless portable device. For discussion purposes, the mobile devices will be generally referred to as wireless mobile handsets. The use of wireless mobile handsets has redefined communication and electronic device proliferation. For many, the wireless handset has become the center of communication and entertainment, with this trend continuing for the foreseeable future. Since the wireless phone is central to modern life, users tend to carry their phone with them at most times, whether on business or on personal time. Also, the functionality of mobile devices has allowed mobile wireless handsets to view, use, and generate more data. For example, mobile devices now routinely work on larger text documents, image files, audio files, spreadsheet files, and other data information.

Often, a user will have multiple wireless mobile devises, as well as a business desktop computer, and a home desktop computer. In a similar manner, a business may have many users with one or more wireless devices, as well as an existing computer network. The logical document management system 10 is able to be deployed in these environments, and seamlessly synchronize data between devices, and confidently backup and protect data. With our increasingly mobile society, the reliance on mobile devices to view and generate digital information is increasing. The logical document management system numeral 10 advantageously assures that data generated at the mobile device is properly and timely distributed to those that need the information, while also assuring that the mobile generated data is properly maintained and backed up. In another important advantage, the logical document management system numeral 10 also enables the mobile devices 12, 14, and 16 to access required information, irrespective of the location where that information was generated. In this way, the mobile device becomes a safe, secure, and convenient data device.

The logical document management system numeral 10 typically includes a more static computer 18 which has substantially more memory and processing horsepower than the mobile devices. Often, computer 18 is a personal computer or a local network device configured to operate office applications, and store significant amounts of data. Typically, computer 18 has a network interface 21 for communicating to wide area networks. The network interface may be, for example, the Internet, or a wideband wireless modem. Either way, the computer 18 is able to communicate to the mobile devices through the over the air communication network 20. This communication may be in the form of an TCP/IP protocol, or may use other messaging systems, such as SMS, EMS, or MMS. It will be appreciated other communication protocols and standards may be used, and others may be developed in the future. Optionally, the logical document management system numeral 10 may also have a server 22. The server may be a local resource of the network or may be at a remote facility. Also, server 22 may be operated by the same person or company that is operating the computer and mobile devices, or may be a contracted third-party server house.

Figure 1B:
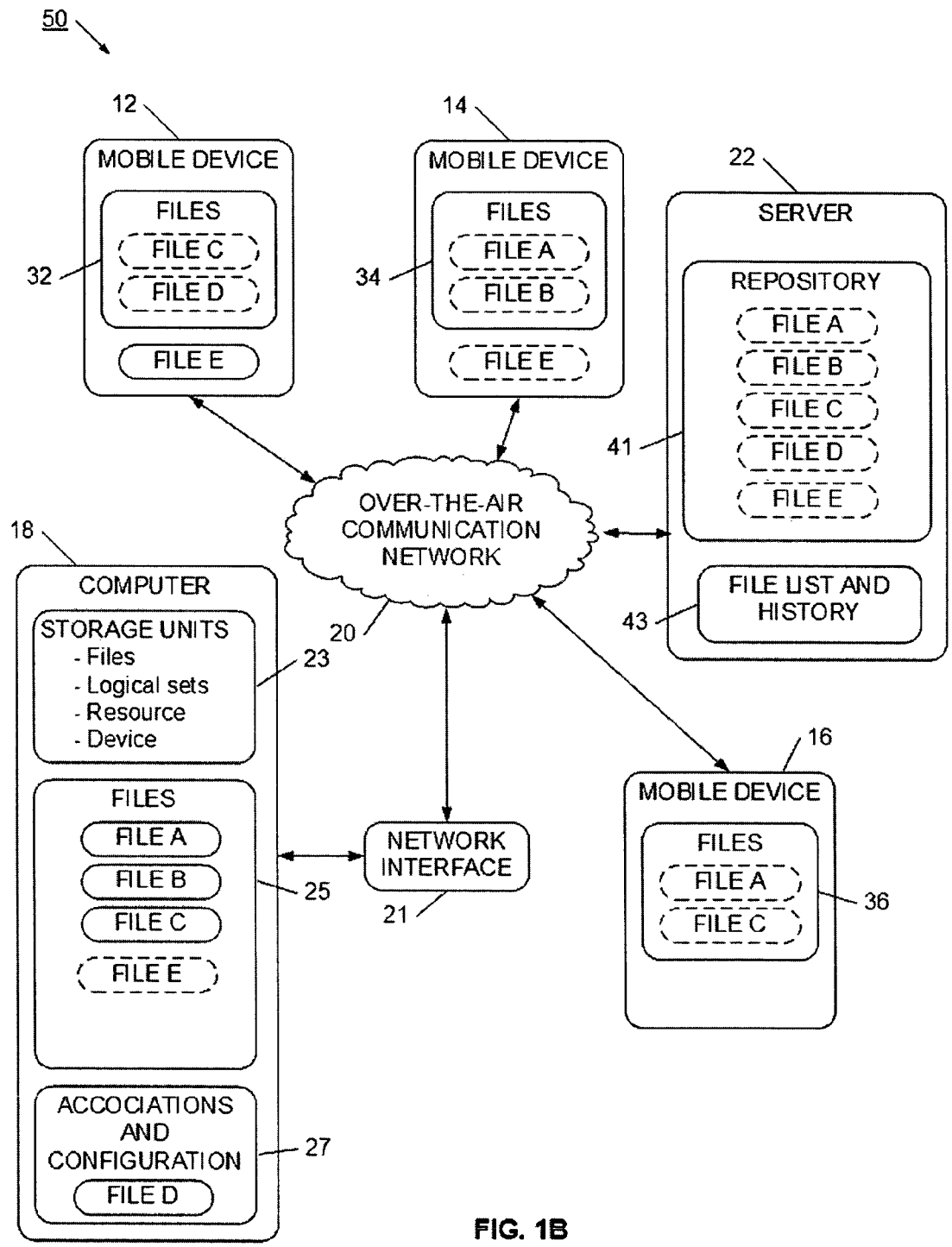
Figure 1C:
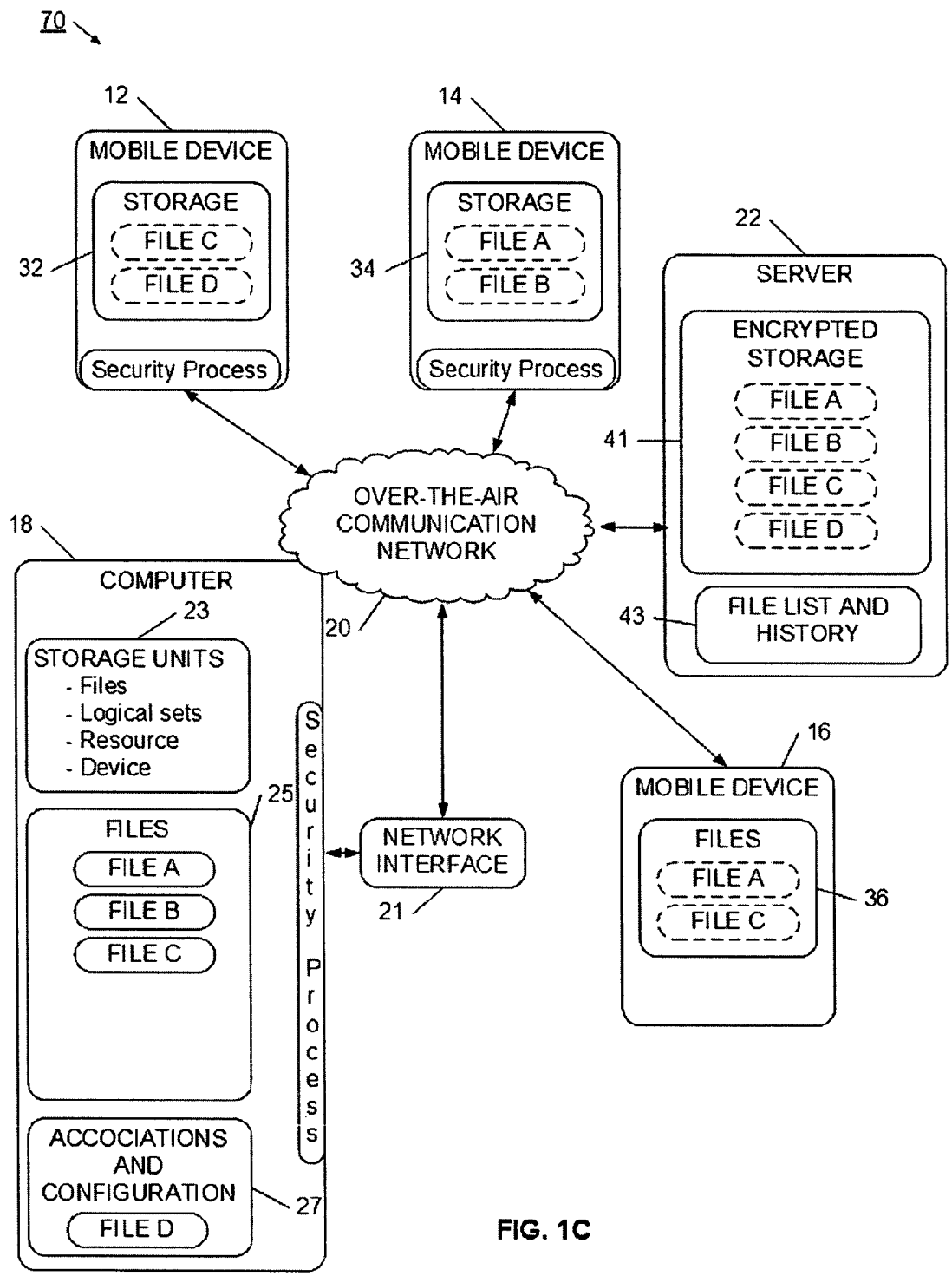

FIG. 1A describes one aspect of logical document management system 10, while FIGS. 1B and 1C show other useful operations. In FIG. 1A, logical document management system numeral 10 is illustrated with computer 18 primarily responsible for the generation of data information, while the mobile devices and server are used for backup of the data. Further, the illustrated example uses logical documents that describe file locations. Even though the simple file descriptors are illustrated, it will be understood that a more complex logical document representation may be used. Storage assets on the mobile device may be used to provide redundant and distributed backup for important files or other logical documents. Also, files or other logical document may be distributed to enable certain mobile devices to have local access to required data. In some cases, to provide for redundancy, the files may also be stored on server 22. Computer 18 employs the concept of a storage unit 23. A storage unit may be, for example a single file, a set of files, or data files on a particular device or resource. In another example, the storage unit may be a logical document or other logical selection of files. In one specific example, a logical set storage unit could be an XML file with external entities distributed over the Internet or other file resources that together form a complete document.

Generally, the storage sets 23 for computer 18 define the complete set of digital information that computer 18 needs to maintain. For example, files 25 would be defined as some of the storage unit files within storage units 23. During the process of initializing the logical document management system numeral 10, particular storage units 23 were associated with a particular mobile device, multiple mobile devices, or the server 22. These associations provide instructions as to where storage units 23 are to be distributed and maintained. For example, file A has been associated with mobile device 14, mobile device 16, and server 22. Accordingly, when backup or synchronization is requested, file A will be distributed or synchronized on the associated devices only. Logical document management system numeral 10 also has been configured during initialization to set configuration instructions as to the when backups are to occur, how many past versions to keep, and how to manage and synchronize data. These associations and configuration information are stored in a file 27, which also may be distributed and stored throughout the backup network.

As illustrated in FIG. 1A, the logical document management system numeral 10 is able to backup files 25 and 27 to selected wireless mobile devices through the over the air communication network 20. For example, files C and D from computer 18 are backed up on to mobile device 12 as shown in block 32. In a similar manner, files A and B are stored on mobile device 14 as shown by block 34, while files A and C are stored on mobile device 16 as shown by block 36. Server 22 has all files as shown by block 41, as well as a more complete file list and history file as shown in block 43, which may be useful for more robust tracking of changes and past versions.

By using a wireless phone as a network storage device, the network logical document management system numeral 10 enables the wireless phone to act as a storage extension or backup device to other devices on the network. As illustrated in FIG. 1B, a mobile device such as mobile device 12 may generate a file E, which also may be a logical document description. File E may then be distributed on to other devices, such as mobile device 14, server 22, and computer 18. In this way, digital information generated on a single mobile device may be timely and seamlessly backed up, as well as synchronized to other devices for ease of access to the information. As illustrated in FIG. 1B, the storage sets 23 defines the complete set of digital information that all the network devices need to maintain. The storage set information is typically collected and stored in one device, for example computer 18, although a more distributed approach may be used.

As described thus far, files or other logical documents may be backed up to any other device in the file management system 10 or 50 irrespective of which device generated the data. More particularly, any particular file or storage unit may be associated with one or more devices, and those devices will be used to back up the defined file or storage unit. Once the file has been stored on that device, that device may then be able to use the data file. For example, the device may read and display the information, and depending upon access control, may be able to change or otherwise amend the data file.

In some cases, additional backup security may be obtained by using logical document management system 70 illustrated in FIG. 1C. In FIG. 1C, the mobile devices 12, 14, and 16, as well as computer 18 each operate a security or encryption process that enables each device to securely transmit data files, but yet are able to locally use the data files according to their access control list. Accordingly, even though the data files are communicated in an encrypted form, they become available and decrypted for use in the local device. However, server 22 does not have access to the security process, and therefore stored files 41 are stored in an encrypted manner so that the files may not be accessed or changed without access to security process. For example, the operators of server 22 may not have access to the security encryption keys necessary to decrypt the data files. By storing files in an encrypted form, data may more confidently be stored on servers under the control of a third-party, since the third-party is not able to access or use the data.

The descriptions of the logical document management systems 10, 50, and 70, have focused on the power of enabling wireless mobile devices to be used for backup purposes, and for the ease of distribution of data in a file network that has wireless mobile devices. The ability to confidently backup and maintain files using wireless devices is a powerful feature, but the logical document management system 10 may readily be adapted to enable more advanced logical document management controls. The logical document management system also has powerful synchronization features which allow intelligent and adaptive proliferation of data throughout the logical document system. For example, multiple wireless mobile devices may be distributed a copy of a particular data file, and each device may have access rights that enable that device to edit its instance of the particular data file. Since the copies of the file are changeable on several devices, it is likely that the content in one file will become out of sync with the content of the data in other files. Accordingly, the network management system provides for weighted merging of changes, with the merge rules defined during configuration. Further, the network management system provides sophisticated notification processes for notifying users or devices that files have been updated to reflect other's changes, or that changes made in the device have been preempted by another higher priority change. By providing for such timely and controlled file synchronization, a user may confidently use information knowing it is current and accurate.

The logical document management system enables a set of devices to cooperate to distribute, synchronize, and backup logical documents. For example, a set of computers, servers, wireless handsets, and notebook devices are used to operate a data network that allows any authorized device to access needed data, irrespective of where or when it was generated. Further, the logical document management system automatically provides for distribution and synchronizations of files, and assures that files are sufficiently redundant to support disaster recovery. In particular, the logical document management system provides for:

a) the systematic discovery of devices so that active devices may be automatically connect to the logical document system;

b) the secure transmission of data between devices;
c) the distribution of data files only to selected and authorized devices;
d) the synchronization of data files so that changes made in the file of one device are promptly updated in other instances of the file on other devices; and
e) the redundancy of files among devices to provide backup of files.

When a backup copy of a file or other logical document is made from one device to another, the storage of the backup file may be adjusted according to the type of file protection desired. For example, the backup file may be made on the second device in a "opaque" way. This means that the primary device encrypts the file and stores the file on the second device, but the second device does not have the ability to decrypt the data file. In this way, the backup file is only usable as a backup file to the primary device, and cannot be used by another other device. This may be accomplished, for example, by encrypting the data file to the primary device's public key, and storing the encrypted file on the second device. When the data file is retrieved by the primary device, it is able to decrypt the file using its private key. Since the private key is known only to the primary device, the encrypted data file is of no use to any other device. The second device may be a wireless handset, a computer, a server, or a server farm operated by a third party, for example.

In another example, the data file may be made on a second device in a "translucent" way. This means that the primary device encrypts the file and stores the file on the second device, and the second device has the ability to decrypt the data file. In this way, the backup file is usable as a backup file for the primary device, and also may be used by the second device. Additional rights may be specified as to the level of rights the second device has to the file. For example, the second device may have only the ability to read the file, or may be given edit capability as well. A translucent data file may be accomplished, for example, by encrypting the data file to the primary device's private key, and storing the encrypted file on the second device. When the data file is used by the second device, the second device can decrypt the file using the primary device's public key. The secondary device may be a wireless handset, a computer, a server, or a server farm operated by a third party, for example.

In another example, the data file may be made on a second device in a "transparent" way. This means that the primary device does not encrypt the file and stores the file on the second device. In this way, the backup file is usable as a backup file for the primary device, and also may be used by the second device. Additional rights may be specified as to the level of rights the second device has to the file. For example, the second device may have only the ability to read the file, or may be given edit capability as well. Since a transparent file has no encryption security, it is the least secure type of storage, but also uses the least processing power. The secondary device may be a wireless handset, a computer, a server, or a server farm operated by a third party, for example.

Figure 2:
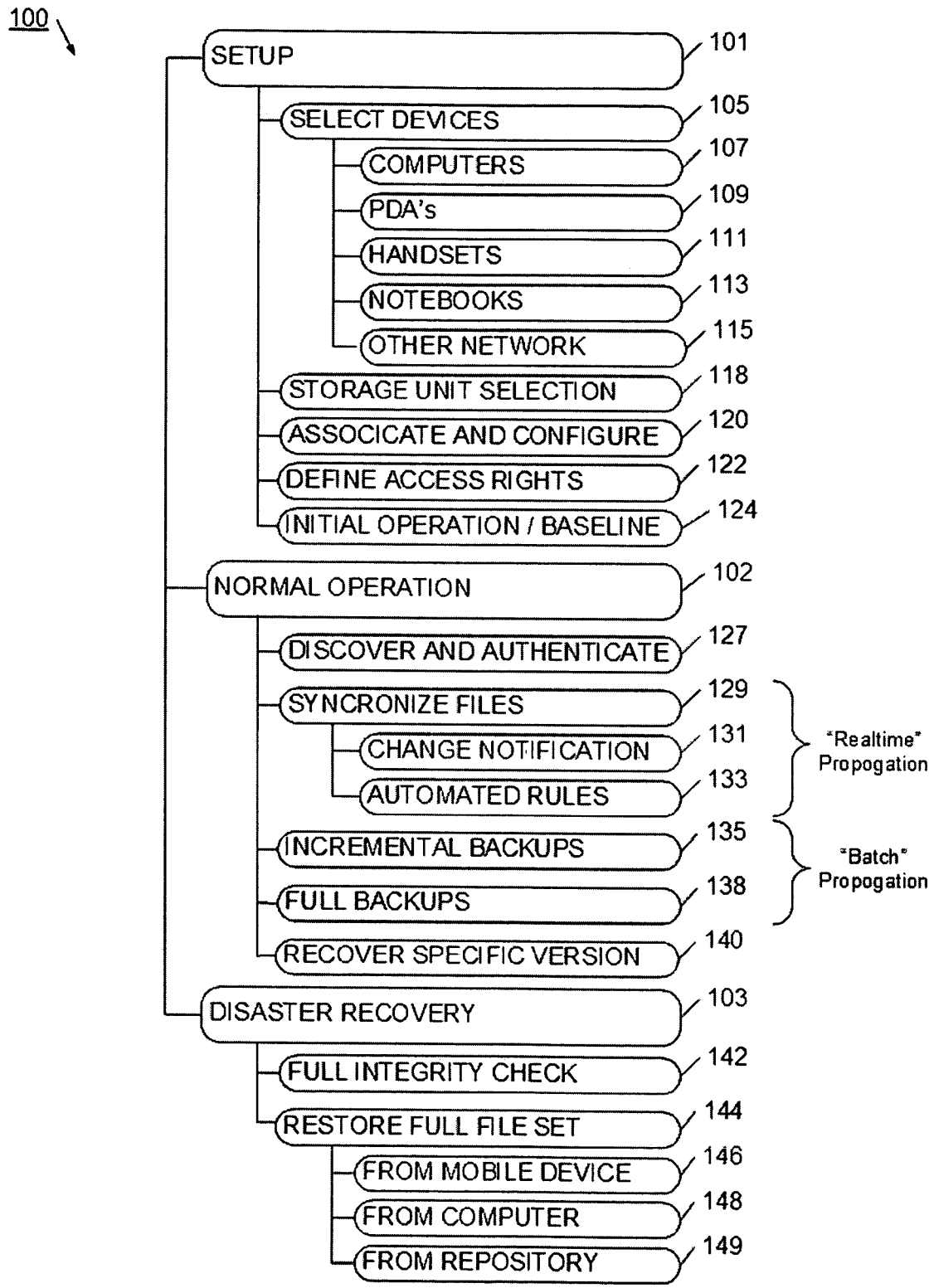
FIG. 2 is a flow diagram of a wireless logical document manager system in accordance with the present invention.

Referring now to FIG. 2, a system for logical document management 100 is illustrated. System 100 operates on a network system, such as logical document management system numeral 50 discussed with reference to FIG. 1B. Method 100 has three general processes. First, the method 100 has a setup phase 101 which initializes and configures the overall network. Second, the system 100 has a normal operation phase 102, which allows files or other logical documents to be automatically and timely synchronized, as well as to provide for secure backups. Finally, method 100 has a disaster recovery phase 103, which is used in response to a catastrophic or fatal failure on one or more devices. As part of setup process 101, the particular devices in the file management system are selected as shown in block 105. These devices may be for example computers 107, personal data assistants 109, wireless handsets 111, notebook computers 113, or other network devices 115. Also, the particular desired storage units are selected as shown in block 118. These storage units may be, for example, files, multiple file sets, directories, devices, network resources, or logically defined file arrangements such as an XML file definition. These storage units may be on the devices selected in 105, or may include other storage units not represented in the devices. The storage units are then associated with particular devices as shown in block 120. In this way, the logical document management system is made aware of which files and storage units are to be stored on which device or sets of devices. Each of these devices may have a different access rights to the associated file as shown in block 122, which may be set in an access list. For example, a file or logical document may be stored on a computer with full read, write, and delete rights, while that file may be stored on a first mobile device with read and write access, and on another mobile device with only read access rights. In this way, access rights may be defined according to storage unit, device, or network requirements. Once the associations and configuration has been completed, the network logical document system may be initially operated to create a baseline distribution of files as shown in block 124. This baseline is used to create support files, configuration files, association files, as well as initially distribute the storage units to their appropriate associated devices. With such a baseline set, incremental operations become more efficient during normal operation.

With setup complete and a baseline set, the process 100 moves to normal operation 102. In normal operation selected devices may move into and out of the network system. For example, some devices may be powered on or powered off at various times, and some devices, such as mobile phones, may move in and out of a wireless service area. Accordingly, as devices are powered on or moved into the network area, a device must be discovered and authenticated as shown in block 127. Generally, the process of discovery enables a mobile device to be recognized as an intended member of the network. Once the mobile device has been discovered, additional processes are used to authenticate the device, as well as established secure and efficient communication. A more complete discussion of discovery and authentication processes are discussed with reference to FIGS. 6-8, and in co pending U.S. patent application Ser. No. 11/296,077, filed Dec. 7, 2005, and entitled "Wireless Controller Device", which is incorporated by reference in its entirety.

During normal operation, files or other logical documents may need to be synchronized as shown in block 129. Although the logical document management process 100 may be used simply as a backup mechanism, additional desirable features may be enabled for synchronizing files. Synchronization generally refers to the process of proliferating changes in one instance of a file to other instances of the file throughout the network. Since it is possible that multiple instances of the file or other logical documents may be changed between synchronization times, synchronization may be accomplished according to a set of automated rules 133. These automated rules may set, for example, the relative weight to apply to a changed file. In a specific example, assume that a financial file has been distributed to a large number of mobile devices, and the network is set to synchronize the financial file every five minutes. In one of these five-minute periods between synchronizations, the file is changed both by a mobile device, and by an order entry computer system. At the next synchronization time, the network process will recognize that the financial file has been changed by two different devices. Accordingly, the network will refer to its automated rules, which may define that the order entry server is given preference over any change by a mobile device. In this way, the change made by the order entry server would be distributed to all instances of the financial file.

A change notification rule 131 may be used to provide notification that a change was either accepted or not accepted. In the specific example above, the mobile handset whose file change was rejected may be sent a notification that its previous entry has been ignored. It will be appreciated that a large number of automated rules 133 and change notification rules 131 may be used consistent with the normal operation 102. It will also be appreciated that synchronization does not have to be done on all files, but may be done on a subset of files within the network. It will also be understood that default synchronization time periods may be used of all selected files, or that synchronization periods may be defined by file or file type. In this way, critical files may be synchronized relatively often, while less important files are synchronized less frequently. As illustrated in method 100, the synchronization rules generally provide for a real-time propagation of changes to files.

The method 100 also allows for a more batch propagation of files or other logical documents in the form of backup processes. Generally, a backup may take the form of an incremental backup 135 or a full backup 138. An incremental backup typically analyzes a file for changes made since the last incremental or full backup, and stores only the changes. In this way, an incremental backup provides a complete record of all changes made to all files, but does so with lowered file and transmission requirements. However, incremental backup is somewhat less secure than a full backup, so is typically supplemented with full backups. A full backup 138 completely backs up each file defined in the storage units, and then acts as a new baseline for future incremental backups. Since a full backup requires significant transfers of data in bandwidth, the backup may be timed such that backup is done during off hours, and devices are staggered during the backup period.

During normal operation, a user may also desire to recover a specific older version of a particular file as shown in block 140. For example, a file or other logical document may have been changed by someone, and a particular user would like to go back to a version prior to when the change was made. Accordingly, the file management system may be constructed to hold past versions for all or selected files. The level of version retention is set during setup and configuration. By allowing devices to recover specific versions, a user is relieved from the manual process of retaining a record of older files.

In the unfortunate occurrence of a device or network disaster, the network process 100 is able to easily perform disaster recovery 103. Disaster recovery generally refers to the ability of a network to rebuild or reclaim data information with no or minimal data loss. Accordingly, the system is able to do a full integrity check as shown in block 142, and is able to restore a full file set or storage unit set as shown in block 144. In performing the disaster recovery, the network intelligently decides whether to take data files from mobile devices, from the computer 148, or from the repository 149. By comparing files between devices, integrity is assured, and with redundant and distributed backup, the full-size file set may be reclaimed or reconstructed.

Figure 3:
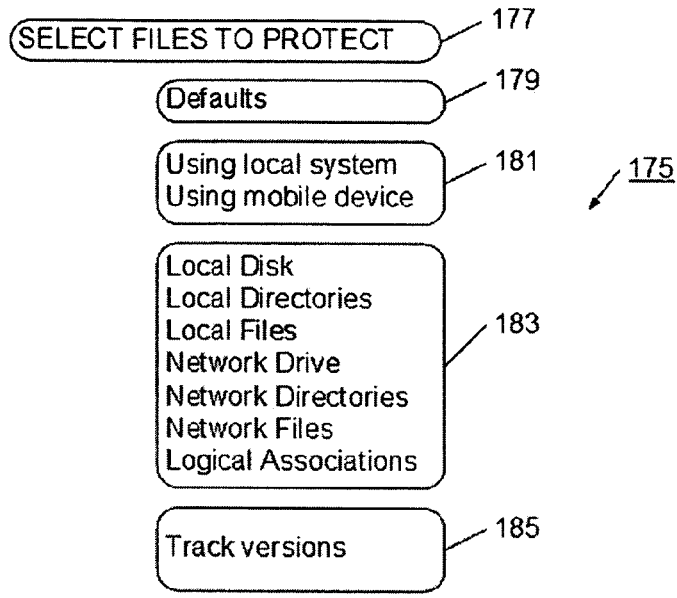
FIG. 3 is a flow diagram of file section for a wireless logical document manager system in accordance with the present invention.

Referring now to FIG. 3, a method for selecting storage units 175 is illustrated. Method 175 is shown selecting particular files to protect and synchronize as shown in block 177. The network system may have default settings 179 for the identification of files, file sets, logical devices, resources, and devices. These defaults may provide for basic synchronization, backup, and security, without user intervention or decision. However, other users may desire more sophisticated synchronization and backup arrangements, and therefore provide for additional or alternative protection and synchronization rules. In defining which rule files to protect, a user may use a local system, such as a computer system as shown in block 181. Also, the user may make selections using an authenticated mobile device also as shown in block 181.

Once the mobile device has been discovered and authenticated, it may be given access into file structure of other devices in the file management system. In this way, the mobile device may make selections of those accessible storage units, and associate those storage units with particular devices. Storage units 183 may be selected to include local files, local directories, the entire local disk, network drives, network directories, network files, or other types of logical associations, or devices. The method also includes identifying whether or not to track versions as shown in block 185, and if versions are tracked, how many levels to maintain. For example, some files may have versions maintained for a few changes, while some files may have changes tracked for every change ever made. In this way, the reconstruction capability for an individual file may be set on a storage unit by storage unit basis.

Figure 4:
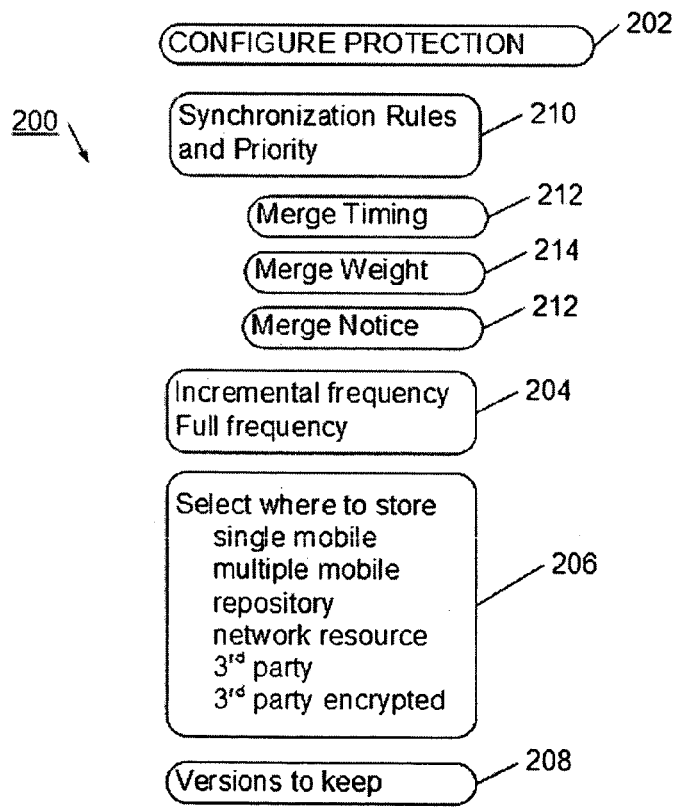
FIG. 4 is a flow diagram of configuration settings for a wireless logical document manager system in accordance with the present invention.

Referring now to FIG. 4, a configuration method 200 is illustrated. In configuration method 200, the specific protection for storage units is defined as shown in block 202. Generally, the configuration includes defining the synchronization rules and priority as shown in block 210, setting incremental and full backup options as shown in block 204, and making specific associations between storage units and available devices as shown in block 206. The configuration of synchronization rules 210 may include how often to perform a merge as shown in block 212. For example, some files or other logical documents may not need synchronization due to their static nature, while other files may require synchronization routinely or very often. The process 200 allows for synchronization to be set on a file by file or storage unit by storage unit basis, thereby allowing network resources to be conserved, while having the flexibility to support application-specific requirements. Since multiple files may have been changed between merge periods, the synchronization rules also include the ability to define a weight to each storage unit or device as shown in block 214. This weight will be used to determine which of conflicting changes will be incorporated, and may define how the unincorporated information will be handled. For example, the unincorporated material may simply be discarded, or may be included in the file as a comment or footnote. In a similar manner, the synchronization rules may include merge notice rules 212. These merge notice rules define when devices or users are notified that a file has been changed. In some cases, if a merged file has discarded changes, the user may also be notified that a previous change has not been accepted into the system.

The synchronization rules enable a defined subset of the storage units to be synchronized in a nearly real-time manner. For a more complete backup of all file systems, an incremental backup may be performed as shown in block 204. An incremental backup typically is a backup of all files, but captures only changes made since the last incremental or full backup. In this way, an incremental backup has far less data that needs to be stored or transferred, thereby conserving network resources. Although an incremental backup is more efficient, a full backup provides additional robustness to the backup system. Accordingly, a full backup may be done as shown in block 204. The frequency of incremental backups may also be set, as well as the frequency for full backups. In one example, an incremental backup may be done on a daily basis, while a full backup may be done each weekend. Preferably, full backups are done at off-peak periods, and devices are backed up in a staggered manner to reduce network traffic.

In configuring the system, the selected files or storage units are associated with one or more devices. These selected devices are where instances of the file or storage units are stored. Depending on the access rights for the device, this file may be merely present as a backup file, or may be usable by the associated device. Again, depending upon access rights, the local device may be able to read, write, or delete the file. A storage unit may be selected to be stored on a single mobile device, multiple mobile devices, in a repository server, on a network resource, on a third party server device, or on a third-party encrypted device, as shown in block 206. As shown in block 208, each device may be set to track a set or maximum number of versions. In this way, a file may be configured to have all previous versions tracked, but for a particular device, the number of versions is reduced due to limited storage or bandwidth considerations. In this way, the storage, distribution, and synchronization requirements may be finely adjusted to application needs.

Figure 5:
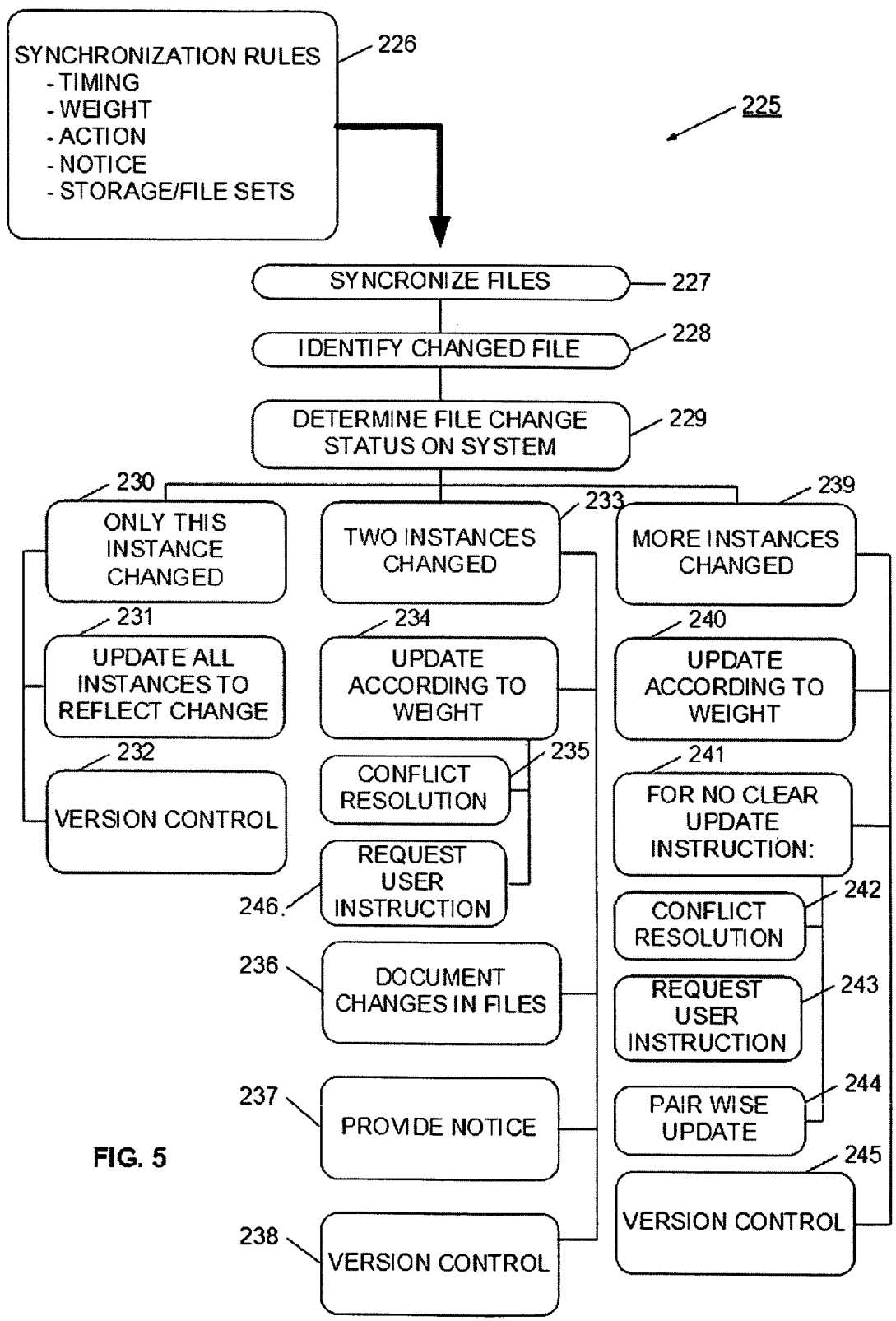
FIG. 5 is a flow diagram of a method for synchronizing files or a wireless logical document manager system in accordance with the present invention.

Referring now to FIG. 5, a method for synchronization 225 is illustrated. Method 225 has synchronization rules 226 that have been defined during configuration of the logical document management system. These synchronization rules may include rules related to how often synchronization is to be performed, the weight to apply to changes made at a particular device, the actions to take when files are merged, any notices to be sent to devices or users, and information regarding storage or file-set information. Based on rules 226, the logical document management system will synchronize files from time to time as show in block 227. Synchronization may be performed periodically or at other predetermined times, or may be done according to dynamic application requirements. During synchronization, the system identifies files that have been changed as shown in block 228. For a changed file, the system will determine if any other device has changed another instance or copy of that file as shown in block 229. If the identified file has only been changed on one device as shown in block 230, then the change can be updated for all instances of the files as shown in block 231. If configured to do so, prior versions of the file may be maintained to support rolling back to the prior version.

In some cases, two devices may have made changes to their respective instances of the data file as shown in block 233. Often, the devices may be assigned a weight, and the relative weight of the devices may be compared as shown in block 234. For example, a computer operated at the corporate offices may be given a higher priority than a mobile device operated by a salesperson. In this way, changes made by the corporate office will take priority over any changes made by a salesperson. In such a case, the changes made by the corporate computer may be used to update all instances of the file throughout the management system as shown in block 236, and the changes made by the salesperson may be discarded, or inserted as a comment in the updated document. The detailed actions taken during an update process may be set during configuration. It will be appreciated that many alternative actions may be used consistent with this disclosure. In some cases the devices making changes to their respective files may have an equal weight as shown in block 235. In such a case, the system management must provide for conflict resolution. Typically, the system will request a user or administrator input to manually resolve a conflict 246, although automated processes may be provided as well. For example, an automated process may include both changes in a document as a footnote or comment. The system may also provide notifications as shown in block 237, which may be used to inform users and devices that changes have been made or ignored. As before, additional prior version information may be stored to accommodate rollback to an earlier version as shown in block 238.

In a more unusual circumstance, more than two instances of a file may be changed by three or more devices as shown in block 239. Typically, such multiple changes are undesirable, and would suggest that a synchronization rate be increased to avoid such situations. In this regard, the management system may adaptively increase synchronization rate for that file. In a similar manner, if a file seldom has a change, its synchronization rate may be reduced. As with the case with two changes, the files may be updated according to the highest weight of the changing device as shown in block 240. However, sometimes there may be no clear update instruction as shown in block 241. This typically will occur when two or more of the devices are operating with the same weight, so a conflict resolution 232 must be made. Conflict resolution often may require user instructions as shown in block 243. In other cases, an automated resolution process may be used. In one example, the three or more changes are updated or merged according to a pair-wise update as shown in block 244. In this way, the files having the lowest weights are first compared, and the result of that update or merge is then compared to files with a higher rate. It will be appreciated that other types of merge or update comparisons may be made consistent with this disclosure. As with other conditions, the system may save version information to facilitate rollback to prior versions.

Figure 6:
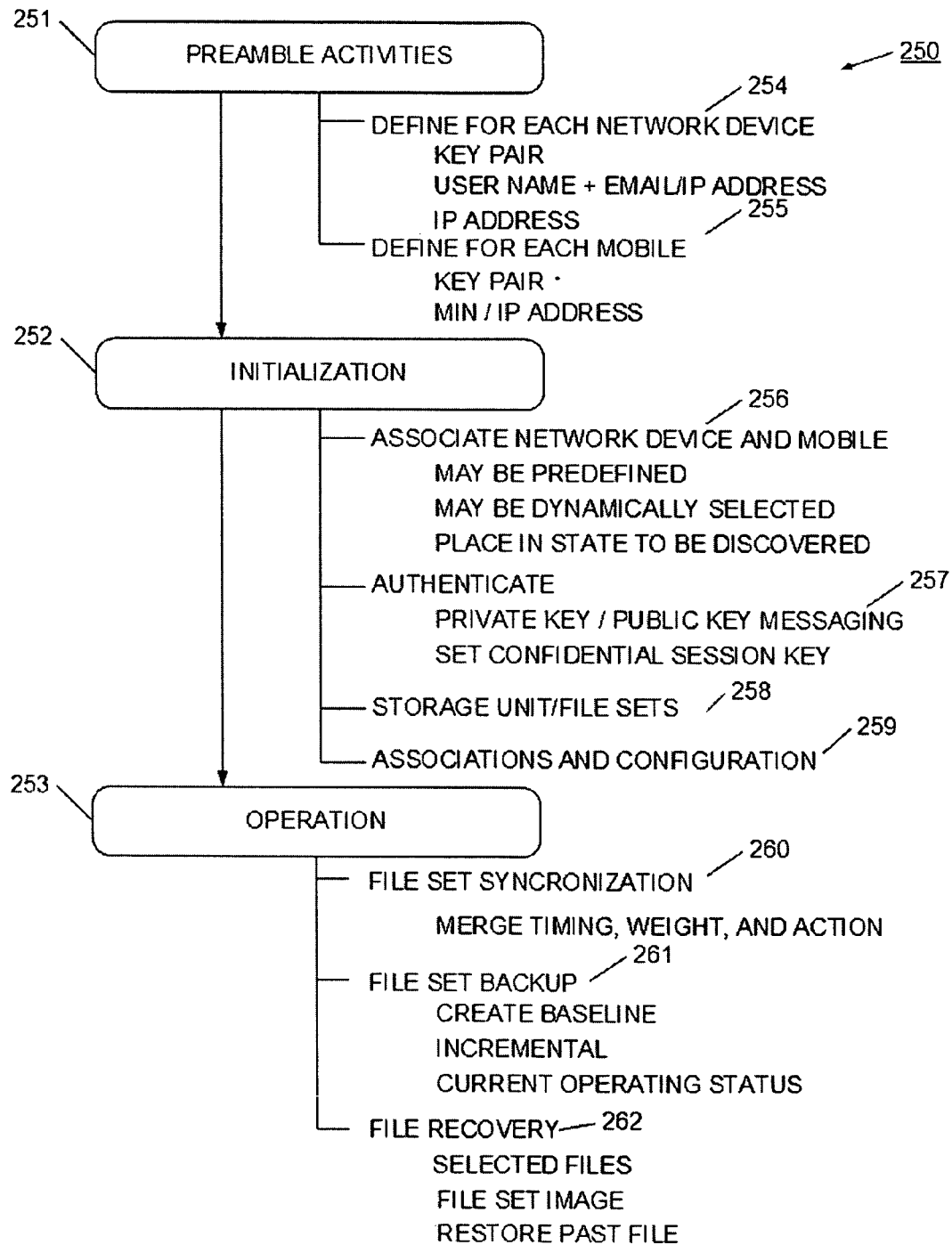
FIG. 6 is a flow diagram of a wireless logical document management system in accordance with the present invention.

Referring now to FIG. 6, a logical document management system 250 is illustrated. For illustrative purposes, the logical document management system will be discussed with reference to a network device, such as a computer, that establishes communication with a wireless mobile device. Logical document management system 250 has preamble activities 251 which are performed prior to a normal operation, initialization steps 252 which are performed to discover and authenticate the network device and mobile devices, and normal operation processes 253 which are used to maintain, synchronize, and backup files. Preamble activities 251 are used to register the network device and mobile devices with a trusted server so that future discovery and authentication processes may be done in a secure and trusted environment. As shown in block 254, a public-key/private key is established for the network device. A public-key/private key pair is useful in establishing asymmetrical secured communication. A handle is also defined for each network device, which enables simplified identification of the network device. For example, the handle for a computer may be the name of the computer on its network, or may be the name of its primary user. In another example, a handle may be the e-mail address for the primary user of a computer, or may be another easy to remember name for the computer. In this way, the trusted server has handle and key information for each available network device. Each mobile also registers with the trusted server as shown in block 255. Each mobile also has a public-key/private key pair, and registers its public-key with the trusted server. Mobile devices typically are identified with their mobile identification number (MIN), which is often referred to as their phone number.

For data enabled devices, the mobile device may be identified by its TCP IP address. In this way, the public-key and address information for each mobile device is also preregistered with the trusted server.

During the initialization process 252, the preregistered network devices and mobiles are associated for a particular file management session. As shown in block 256, this association may be predefined, or may be dynamically set during initialization. In one example, a network has a particular set of mobile devices which hold selected data files, and upon initialization, the network attempts to establish a trusted communication with each of the authorized mobiles. In another example, the set of wireless mobile devices may not be preauthorized, but may be disovered upon initialization. In this way, mobile devices may be placed in a state to be discovered, and the network may be placed in a state to receive requests from mobile devices. In a typical example, the network is made operational and operates the file management system. A mobile device makes a request to join the network. The network is in a state where it is able to receive the mobile's request, and then proceeds to further authenticate the mobile device. For example, the process may move to the authentication step as shown in block 257. The network and the mobile use asymmetric cryptography to authenticate each other. In the process a time-limited session key is also communicated between the network and the mobile to allow for more efficient communication. After authentication, data in the session is encrypted using the session key. It will be appreciated that the asymmetrical private key/public-key messaging protocols consume valuable mobile processing power, and therefore a more efficient symmetrical security system may be desirable. In this way, after secure and trusted communication is established, the network and mobile communicate securely via symmetric encryption using a session key. The network and the mobile use asymmetric cryptography to authenticate each other. In the process a time-limited session key is also communicated from one of the network and the mobile to the other. After authentication, data in the session is encrypted using the session key.

As shown in block 258, the network selects the storage units or files that are to be maintained by the file management system. These storage units may be individual files, sets of files, directories, disks, all files on a device, or some logical file arrangement. The list of storage units may be continually updated as new files are generated, new devices added, as files are deleted, or as devices are removed from the file management system. It will also be appreciated that the storage units may include files or data not on network devices. For example, the storage unit may be a URL that links to a data set on a remote Internet server, or may be a logical document description.

With the network devices defined, and the storage units selected, the process move to associate the devices with the storage units, as shown in block 259. In this way, particular storage units or files are assigned to be maintained on a particular one or set of network devices. Also, the system allows configuration to be set to control the synchronization and backup processes. For example, the configuration may set how often synchronization, incremental backups, and full backups are to be performed. The configuration may also set how many past versions of a file to maintain, as well as set access control for files. The initialization process is completed, and a baseline set of files is propagated to the appropriate devices.

The process is now ready for normal operation 253. In normal operation, the process may allow for file set or other logical document synchronization 260. This enables a real-time updating of files, so that consistent and accurate data is available to the selected devices. For purposes of this discussion, the term "realtime" is not used in its strict engineering sense, but to indicate that files are automatically updated from time-to-time at a rate sufficient to support application needs. In some cases, this may require resynchronization periods measured in minutes, while for other files, the resynchronization period may be much longer. During configuration, a set of synchronization rules were defined that set synchronization timing, merger priority and weights, and the actions to be taken when conflicts exist. During operation, these rules are automatically and systematically applied, and may be set to adapt to current application requirements.

The system also automatically and systematically performs backup functions 261. Backup may be done incrementally, which stores changes from a previous baseline backup. Incremental backups may be performed relatively often, as they consume relatively little network, file, and communication resources. However, incremental backups may become unwieldy as the difference becomes substantial between the baseline backup and the current file set. Therefore, a full backup of all files may be done, which also provides a better level of file protection and a simplified restore process. During configuration, the types and timing of the backup process was defined.

During normal use, a user may desire to restore a file or set of past files that were inadvertently deleted. In another example, a user may desire to go back to an earlier version of a document, or to track who has made changes in a document. Provided a file has been configured to keep past versions, a user may restore past versions of a file. The management system may keep some level of past versions on one device or devices, and a more complete history on another device, such as a repository server.

Figure 7:
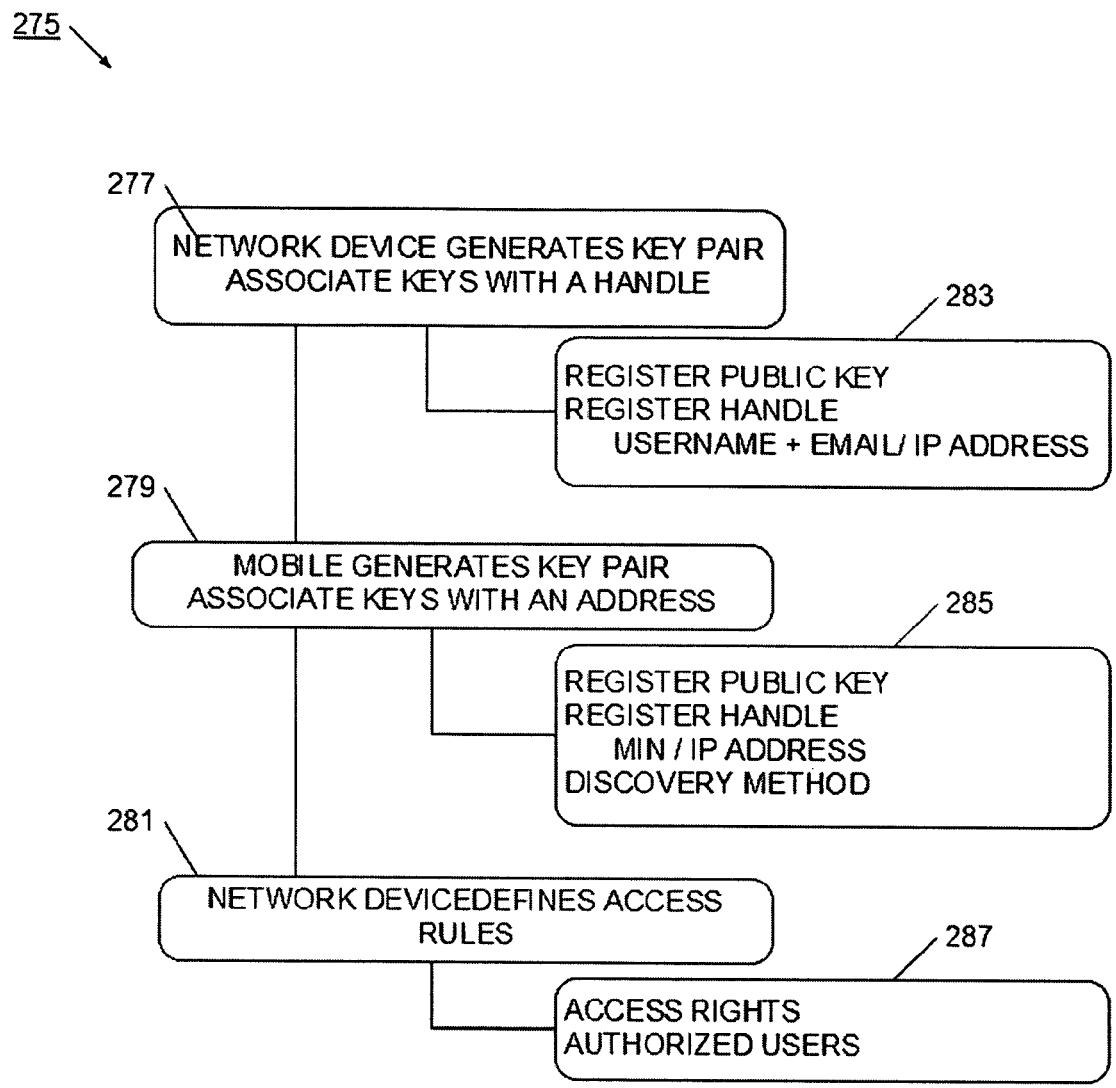
FIG. 7 is a flow diagram of initializing a wireless logical document management system in accordance with the present invention.

Referring now to FIG. 7, a system for performing preamble activities for a logical document management system is illustrated. Method 275 has a network device operating on the file management system. In one example, the network device may be a desktop computer system or a computer server. The network device has communication capability such that it may establish communication with a trusted server, such as a key server. The network device generates a private key and public key pair as shown in block 277. The network device also has a handle, which may be a name, e-mail address, or other easy identification value or indicator. The network device registers its public key, handle, or name with the trusted key server as shown in block 283. In a similar manner, a mobile wireless device generates a private and public key pair and registers its public-key, and handle with the trusted server, as shown in blocks 279 and 285. For a mobile, the handle typically will be its mobile identification number, although in other cases it may be its TCP/IP address. Also, the mobile may register its preferred discovery method with the trusted server. For example, some mobile devices may more efficiently respond to an SMS, MMS, or EMS message, while other mobile devices may respond more efficiently to TCP/IP communications.

More specifically, a mobile device may be configured to operate a small process which acts to determine when a network device desires to establish a trusted communication. This small process may monitor for an SMS/MMS/EMS message, and more particularly may monitor for an SMS/MMS/EMS message with a particular code, value or message. In this way, a network device, either alone or with in cooperation with a trusted server, may send a predefined SMS/MMS/EMS message to a mobile, and the mobile may therefore be aware that a network device is trying to establish communication. In another example, a mobile may have TCP/IP enabled communication, and may therefore identify a particular port for receiving requests from network devices. When a request is received on this specific port address, the mobile device becomes aware that the network device desires to establish trusted communication. It will be appreciated that some mobile devices have both SMS/MMS/EMS and TCP/IP communication capability, and decision on which to enable may be made on application specific requirements. In another example; the mobile may register both types of discovery methods, and the target may attempt both methods in established communication.

During initialization, the network device may also define particular access limits 281 for a specific mobile, a set of mobiles, or all mobile devices. For example, if the network device enables a mobile device to access its file structure, mobile devices may be restricted to particular files, or particular folder structures within the file system. In another example, the access rights may be established for each mobile individually, or may be established for sets of mobile devices. Also, it will be appreciated that the access rights 287 are only the predefined access rights, and may be changed as specific communications are established between mobile and target devices.

Figure 8:
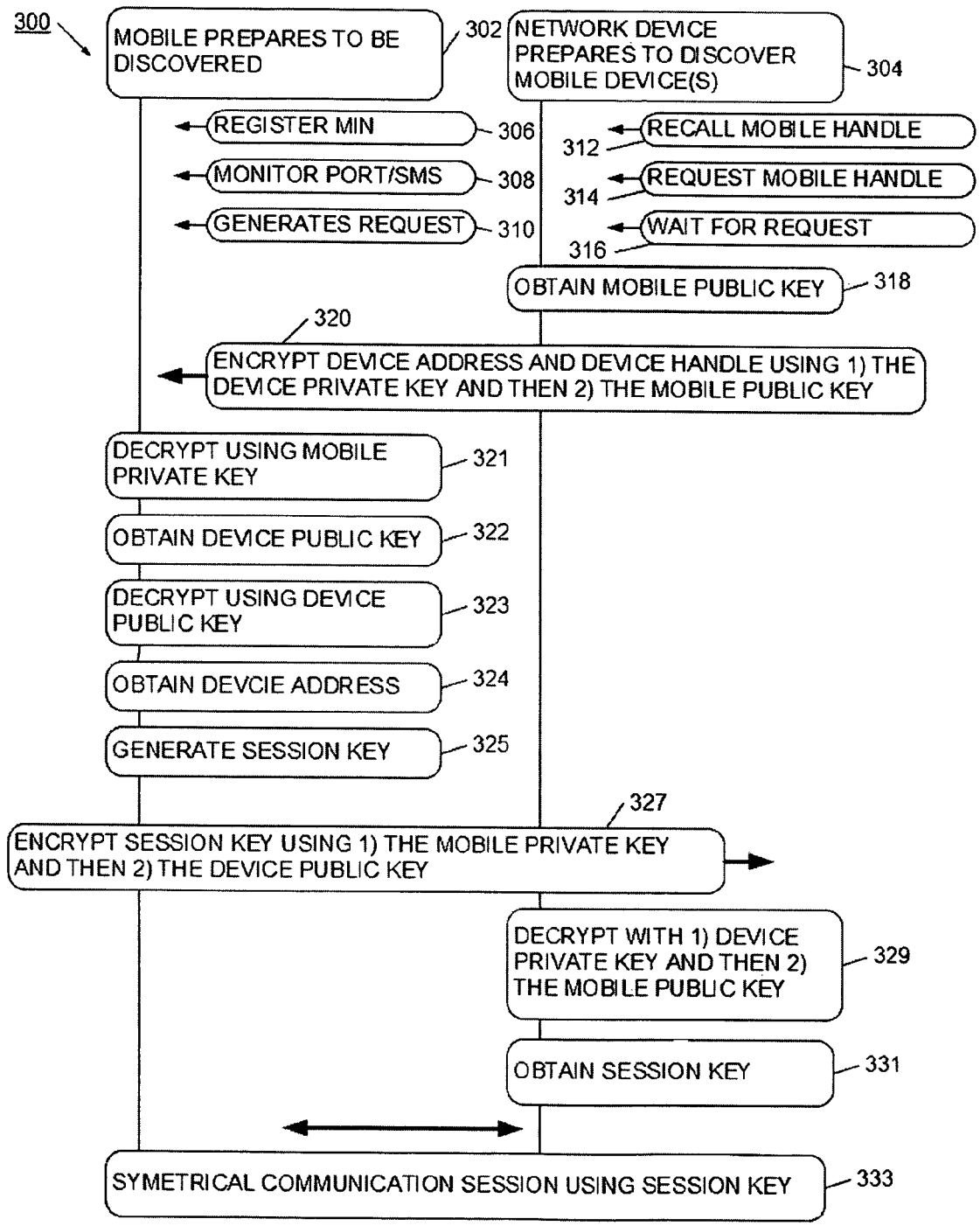
FIG. 8 is a flow diagram of a wireless logical document management system in accordance with the present invention.

Referring now to FIG. 8, a method of discovering and authenticating 300 is illustrated. Method 300 has a mobile device that is prepared to be discovered as shown in block 302. In this way, the mobile device may have registered its mobile identification number and public key as shown in block 306. After registration, the mobile device monitors its SMS messages, or its TCP/IP ports, for contact by an appropriate network device. If such a request is made, then the mobile starts a local client process and continues to establish trusted communication. In another example as shown in block 310, the mobile device may generate a request to connect to a specific network device. For example, a user may walk into a room and desire to have his or her mobile phone become a disk device for a computer system. The mobile user may be invited to send a message to the computer, and thereby begin the establishment of trusted communication.

The network device is also prepared for discovery as shown in block 304. In one example, the network device has a set of predefined mobile devices that are authorized to control it. In this way, the network device may simply recall the mobile addresses as shown in block 312. In other cases, the network device may receive requests for communication, and thereby need to request a specific mobile handle (MIN or address) as shown in block 314. Finally, the network device may have made itself available to receive requests, and thereby wait for requests from mobile devices as shown in block 316. Irrespective of which process is used to obtain the mobile address information, the network device cooperates with the key server to obtain the mobile public-key 318. The mobile public-key, which has been prestored by the mobile device, is associated with the address for the mobile device. In this way, the network device is able to retrieve the public-key for the mobile device. The network device then encrypts the target IP address and the network device handle using first the network device private key and then the resulting message is encrypted to the mobile public-key 320. This twice encrypted message is then transmitted wirelessly to the mobile device. The mobile device, using its private key, decrypts the message 321. Upon decrypting with its private key, the mobile obtains the handle for the network device 322. The mobile is then able to communicate with the trusted server to obtain the public-key for the network device. Using the public-key of the network device, the mobile further decrypts the message 323 and obtains the network device address as shown in block 324.

Upon confirming messages and addresses, the mobile confidently trusts the origination of the network device message. Accordingly, the mobile generates a session key as shown in block 325. The session key is intended for symmetrical communication encryption, which is more efficient then asymmetrical encryption. The session key is encrypted by the mobile using its private key, and then encrypted to the network device's public-key as shown in block 327. The twice encrypted session key is then wirelessly communicated to a network device as shown in block 327. The network device then decrypts the message using its private key and then the mobile public-key as shown in block 329. Provided the decryption process completes successfully, the network device has authenticated the mobile as a trusted communication partner. It also has obtained the session key as shown in block 331. The network device and mobile may then proceed with symmetrical communication encryption as shown in block 333. The process illustrated with FIG. 8 is used to establish a trusted communication between a network device and a mobile. Further, the process described with reference to FIG. 8 also enables network devices and mobile devices to preregister with a trusted third party, and then upon application needs, establish control relationships between mobile devices and network devices.

Figure 9:
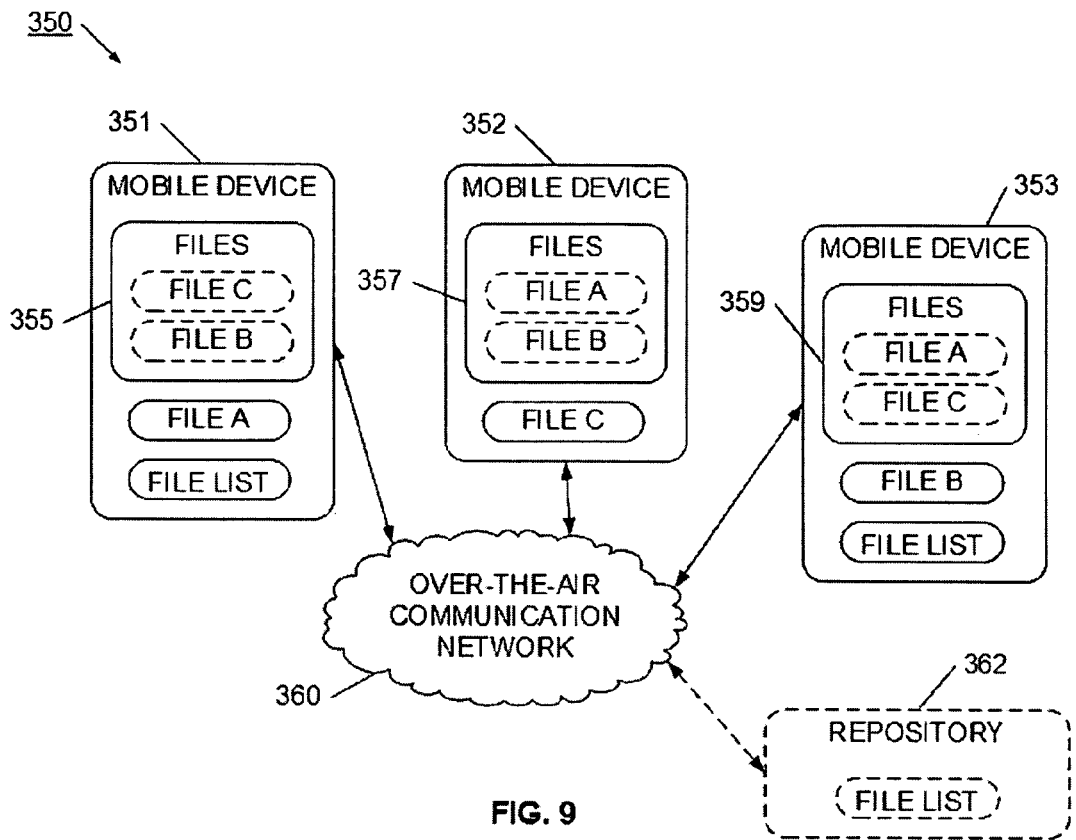
FIG. 9 is a block diagram of wireless logical document manager system in accordance with the present invention.

Referring now to FIG. 9, a logical document management system 350 is illustrated. Logical document management 350 has mobile devices 351, 352, and 353 communicating through an over the air communication network 360. Communication network 360 may be, for example a public wireless phone or data system, or a government, industrial, or military communication system. Typically, each mobile device will be a device such as a wireless handset or personal data assistant, although other mobile devices may be used. The over the air communication network 360 also connects to a repository server 362. File management system 350 shows a backup and synchronization system using only wireless mobile devices. For example, mobile device 351 has generated file A, which is backed up to file area 357 on mobile device 352 and to file area 359 on mobile device 353. In a similar manner, mobile device 352 has generated file C, which is backed up to file area 355 on mobile device 351 and to file area 359 on mobile device 353. It will be understood that the files may be simple files, or represent data for more sophisticated logical document descriptions.

The storage unit list and associations are stored on mobile device 351 and on mobile device 353. Since the file or logical document list is essential for backup and recovery, a copy of the list is stored on a repository 362. This repository may be another mobile device, or may be a personal computer or other network device. As with other logical document management systems previously discussed, the logical document management system 350 may be configured for real-time synchronization of files, may set access rights to files on an individual device basis, may be used for incremental backups, and may provide incremental or full backups. Since the file management system 350 allows a mobile device to view file structures and storage units for other mobile devices, any one of the mobile devices may be used to select storage units, associate devices and storage units, and set configurations. In another example, a computer system may be used for configuration purposes, and then the file lists imported to the devices. Advantageously, system 350 enables a set of mobile devices to perform near real-time synchronization and seamlessly provide backup and security functions.

Figure 10:
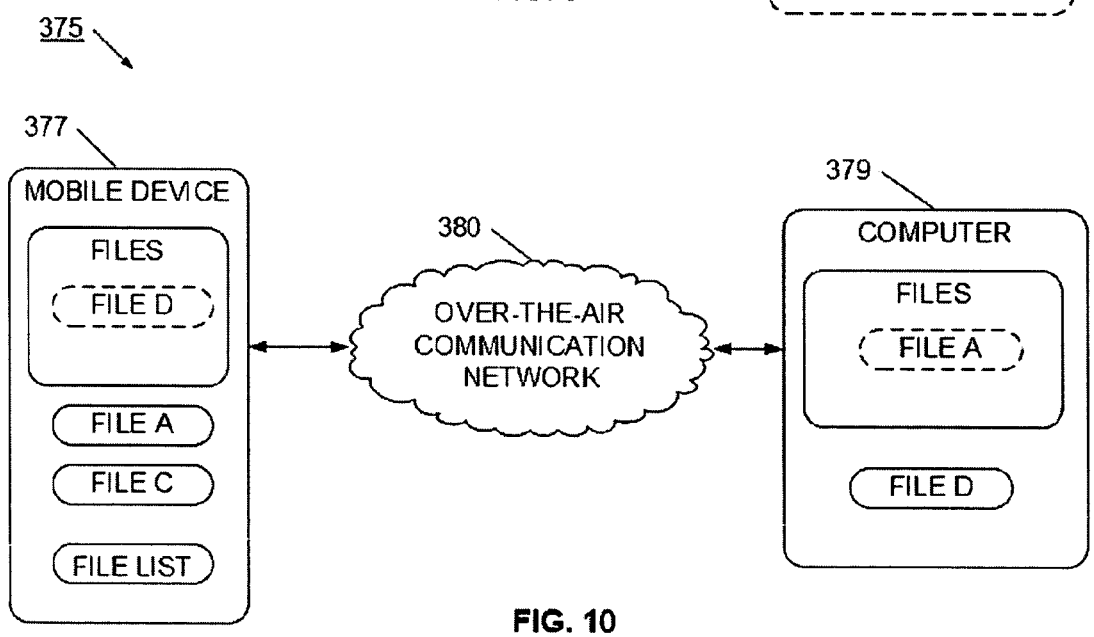
FIG. 10 is a block diagram of wireless logical document manager system in accordance with the present invention.

Referring now to FIG. 10, a logical document management system 375 is illustrated. Logical document management system 375 has a mobile device 377, which may be in the form of a wireless handset. Wireless handset 377 communicates using an over the air communication network 380. This over the air communication network may be for example, a public voice or data communication network, or may be a proprietary commercial, military, or government communication system. A computer 379 also communicates to the over the air communication network, typically through an Internet or other wide area network connection. In operation, the mobile device 377 and computer 379 perform a discovery and authentication process. Once discovery and authentication has occurred, the mobile device 377 appears as a storage device for computer 379, or the computer may show as a storage device available to mobile device 377. In this way, data transfers may be made in a comfortable and known way.

In a specific example, the mobile device 377 may appear as a disk drive to computer 379. In this way, an operator at computer 379 may store data on to a mobile device 377, or read files or other information from the mobile device 377. In this arrangement, the network management system 375 operates to enable a mobile device to appear as a standard storage device to a computer system. In a similar manner, the computer 379 may be viewed as a disk drive or network drive for mobile device 377. In this way, data stored on device 379 is presented to the user of mobile device 377 in the usual and comfortable file structure used by the mobile device 377. Mobile file manager 375 also includes the automated file synchronization and backup processes previously discussed. In this way, files generated on the mobile device 377 may be automatically backed up and synchronized with files on computer 379, and files generated on computer 379 may be synchronized and backed up with files on device 377.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A method for managing logical documents on a network, comprising:
   (a) connecting a plurality of mobile communication devices to the network through a communication network and assigning a weight to each of the plurality of mobile communication devices;
   (b) providing a storage device on the network as a logical disk drive to the plurality of mobile communication devices that is capable of storing a file;
   (c) at least two of the plurality of mobile communication devices modifying a copy of the file in a different way, such that each of the at least two of the plurality of mobile communication devices has an associated modified version of the file;
   (d) identifying those of the plurality of mobile communication devices that have a modified version of the file;
   (e) for each of the identified plurality of mobile communication devices, comparing relative weights of the plurality of mobile communication devices and based on the comparison performing:
      1. when the weight of each of the plurality of mobile communication devices is not equal, then updating the file in the storage device with the modified version of the file associated with the mobile communications device with the largest weight; and
      2. when the weight of at least two of the plurality of mobile communication devices are equal and the equal weight is the largest among the plurality:
         a. requesting a user to manually select from the modified versions of the file associated with the plurality of mobile communication devices with equal and largest weights, then updating the file in the storage device based on the selection; or
         b. updating the file with information from the modified versions of the file in the storage device associated with the plurality of mobile communication devices with equal and largest weights.

2. The method of claim 1, further comprising notifying the plurality of mobile communication devices that the file has been updated according to step (e).

3. The method of claim 1, wherein frequency of step (e) is pre-determined.

4. The method of claim 1, wherein frequency of step (e) is determined by the frequency of an occurrence of step (e)(2).

5. The method of claim 1, wherein step (e) is initiated by a user of one of the plurality of mobile communication devices.

6. The method of claim 1, wherein frequency of step (e) is determined by a bandwidth of the communication network.

7. The method of claim 1, wherein the updating of the file comprises storing at least one previous version of the file along with the updated file.

8. The method of claim 7, further comprising rolling back the version of the file to a previous version of the file.

9. The method according to claim 1, wherein at least one of the plurality of mobile communication devices connects to the communication network via wireless connection operating according to CDMA, OFDMA, CDMA2000, UMTS, GSM, GPRS, EDGE, PHS, or PCS.

10. The method according to claim 1, wherein the storage device is a wireless mobile handset.

11. The method according to claim 1, wherein the storage device is one of the plurality of mobile communication devices.

12. The method according to claim 1, wherein the storage device is a computer, a wireless device, a server, a repository server, or a network resource on a network.

13. The method according to claim 1, wherein the file comprises XML documents, files, file sets, directories, file structures, devices, drives, or URLs.

14. The method according to claim 1, wherein the file is encrypted and the storage device can not decrypt the file, so that the file is opaque to the storage device.

15. The method according to claim 1, wherein the file is encrypted and the storage device can decrypt the file, so that the file is translucent to the storage device.

16. The method according to claim 1, wherein the file is not encrypted, so that the file is transparent to the storage device.

17. The method according to claim 1, wherein each of the plurality of mobile communication devices has read, or read/edit access rights to the file.

18. The method o claim 1, wherein the plurality of mobile communication devices are selected from the following: a computer, a mobile phone, a personal data assistant or a portable music player.

* * * * *